United States Patent
Floratou et al.

(10) Patent No.: US 11,900,085 B2
(45) Date of Patent: Feb. 13, 2024

(54) SYSTEM AND METHOD FOR SEMANTIC AWARE DATA SCIENCE

(71) Applicant: Microsoft Technology Licensing, LLC, Redmond, WA (US)

(72) Inventors: Avrilia Floratou, Sunnyvale, CA (US); Andreas Christian Mueller, Los Gatos, CA (US); Dalitso Hansini Banda, Mountain View, CA (US); Joyce Yu Cahoon, Woodinville, WA (US); Anja Gruenheid, Seattle, WA (US); Neha Godwal, Verona, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 41 days.

(21) Appl. No.: 17/692,770

(22) Filed: Mar. 11, 2022

(65) Prior Publication Data
US 2023/0289154 A1    Sep. 14, 2023

(51) Int. Cl.
G06F 8/41    (2018.01)

(52) U.S. Cl.
CPC .............. *G06F 8/425* (2013.01); *G06F 8/423* (2013.01)

(58) Field of Classification Search
CPC .................................. G06F 8/425; G06F 8/423
See application file for complete search history.

(56) References Cited

U.S. PATENT DOCUMENTS

2018/0067732 A1    3/2018    Seetharaman et al.
2019/0361891 A1*   11/2019    Griffith ............... G06F 12/0802

OTHER PUBLICATIONS

Kadiyala et al., "Applications of Python to Evaluate Environmental Data Science Problems" (Year: 2017).*
Drosos et al., "Wrex: A Unifed Programming-by-Example Interaction for Synthesizing Readable Code for Data Scientists" (Year: 2020).*
Perez et al., "Python: an ecosystem for scientific computing" (Year: 2010).*
King-Fung lu, "Objectbase: An integrated development environment" (Year: 1994).*
McGibbon et al., "MDTraj: A Modern Open Library for the Analysis of Molecular Dynamics Trajectories" (Year: 2015).*

(Continued)

*Primary Examiner* — Phillip H Nguyen
(74) *Attorney, Agent, or Firm* — Weaver IP L.L.C.

(57) ABSTRACT

Systems, methods, and devices are described for enabling a user to import a library into a computer program under development. The library includes a data storage interface, one or more semantic objects, and one or more data manipulation or data analysis operations. A user is able to reference code of the library within the computer program under development to generate a dataset from data obtained via the data storage interface and associate the one or more semantic objects with the dataset to generate a semantically-annotated dataset. Systems, methods, and devices enable, based on the importing: the user to invoke a semantic-guided operation of the library that utilizes the semantically-annotated dataset to infer an aspect of a data manipulation or data analysis operation to be performed on the semantically-annotated dataset; or the suggestion of a data manipulation or data analysis operation to the user based on the semantically-annotated dataset.

20 Claims, 8 Drawing Sheets

(56) References Cited

OTHER PUBLICATIONS

Szymanski et al., "scikit-multilearn: A scikit-based Python environment for performing multi-label classication" (Year: 2016).*
M.F. Sanner, "Python: A Programming Language for Software Integration and Development" (Year: 1999).*
Kandel, et al., "Wrangler: Interactive visual specification of data transformation scripts", In Proceedings of the SIGCHI Conference on Human Factors in Computing Systems, May 7, 2011, pp. 3363-3372.
Lee, et al., "Lux: Always-on visualization recommendations for exploratory dataframe workflows", In Repository of arXiv:2105.00121v1, Apr. 30, 2021, pp. 1-15.
"International Search Report and Written Opinion Issued in PCT Application No. PCT/US22/051346", dated May 22, 2023, 17 Pages.
Ward, et al., "Matminer: An open source toolkit for materials data mining", In Journal of Computational Materials Science, vol. 152, May 7, 2018, pp. 60-69.

* cited by examiner

SYSTEM AND METHOD FOR SEMANTIC AWARE DATA SCIENCE

BACKGROUND

Various software tools exist that enable data scientists to perform data manipulation and data analysis operations on datasets that may be used in developing machine learning (ML) models. For example, Pandas is an open-source Python® library that a data scientist can import into a data science notebook or Python script to access various data structures and operations for manipulating datasets. Other software tools leveraged by data scientists for operating on datasets include NumPy and SciPy. However, all of these software tools are designed to operate on the raw data without leveraging any higher-level metadata, thus forcing the data scientists to spend a significant amount of time trying to understand, clean and transform the data before even beginning to design ML models. Furthermore, the knowledge that a data scientist gains about a particular dataset as they are working with it cannot easily be shared with other data scientists that may also work with the same dataset. At present, a data scientist must utilize external tools (e.g., wikis, sharing Python notebooks) to share information about the data.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for enabling semantic aware data science. In one aspect, a user is enabled to import a library into a computer program under development (e.g., a data science notebook or Python script). The library includes a data storage interface, one or more semantic objects, and one or more data manipulation or data analysis operations. Based on the importing, the user is able to reference code of the library within the computer program under development to generate a dataset from data obtained via the data storage interface and associate the one or more semantic objects with the dataset to generate a semantically-annotated dataset. Furthermore, systems, methods, and devices enable, based on the importing, one or more of: the user to invoke a semantic-guided operation of the library that utilizes the semantically-annotated dataset to infer an aspect of a data manipulation or data analysis operation to be performed on the semantically-annotated dataset; or the suggestion of a data manipulation or data analysis operation to the user based on the semantically-annotated dataset.

In a further example aspect, a library may be imported into a computer program (e.g., a data science notebook or a Python script). The library includes a data storage interface, one or more semantic objects, and one or more data manipulation or data analysis operations. A dataset is generated from data obtained via the data storage interface. One or more semantic objects are associated with the dataset to generate a semantically-annotated dataset. A semantic-guided operation of the library is performed. The semantic-guided operation utilizes the semantically-annotated dataset to infer at least one aspect of a data manipulation or data analysis operation to be performed on the semantically-annotated dataset.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
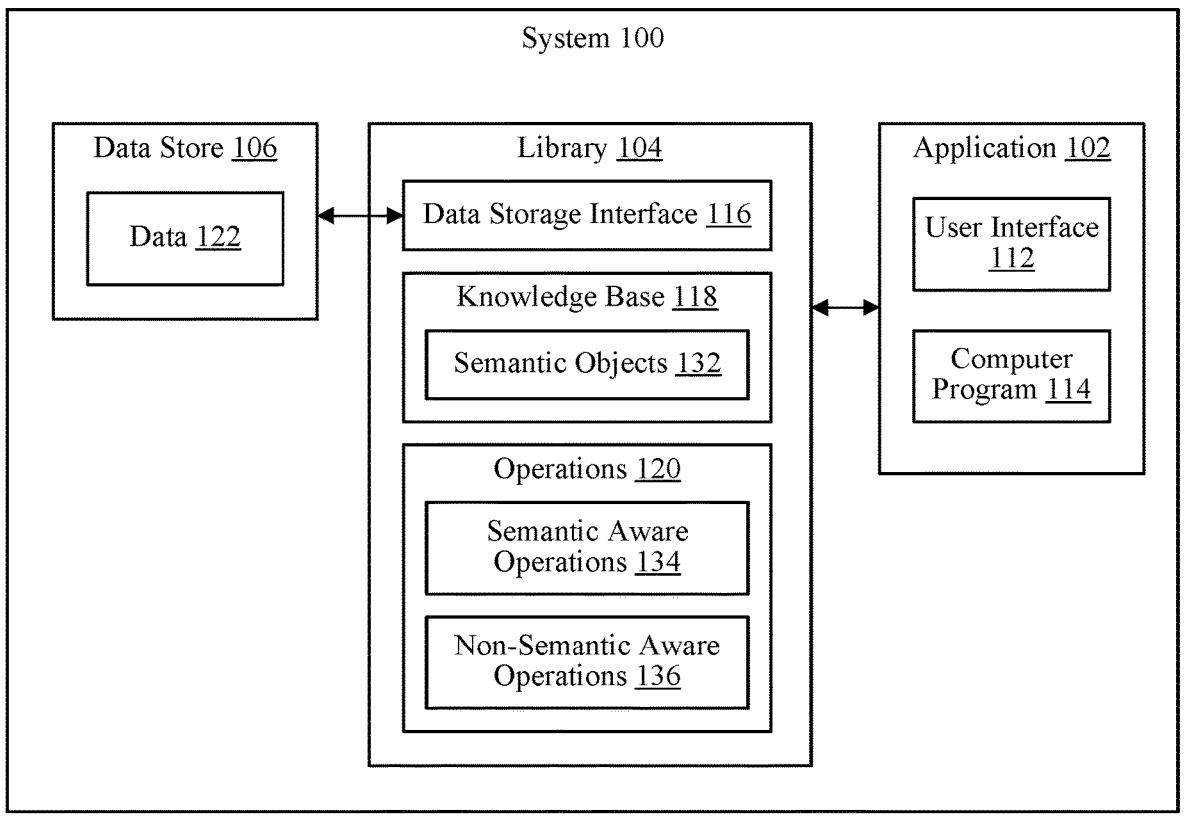
FIG. 1 is a block diagram of a system that may be used to conduct semantic aware data science, according to an example embodiment.

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Systems and Methods for Semantic Aware Data Science

In data science applications, a dataset may be stored, manipulated and analyzed in various formats. A dataset may comprise a labeled one-dimensional array (also referred to as a series), a labeled two-dimensional array (also referred to as a dataframe), or any other data structure used to organize data. Data manipulation and data analysis operations may be performed on a single dataset or across multiple datasets.

As discussed in the Background Section above, various software tools exist that enable data scientists to perform data manipulation and data analysis operations on datasets that may be used in developing ML models. For example, Pandas is an open-source Python library that a data scientist can import into a data science notebook or Python script to access various data structures and operations for manipulating datasets. Other software tools leveraged by data scientists for operating on datasets include NumPy and SciPy. However, all of these software tools are designed to operate on the raw data without leveraging any higher-level metadata, thus forcing the data scientists to spend a significant amount of time trying to understand, clean and transform the data before even beginning to design ML models. Furthermore, the knowledge that a data scientist gains about a particular dataset as they are working with it cannot easily be shared with other data scientists that may also work with the same dataset. At present, a data scientist must utilize external tools (e.g., wikis, sharing Python notebooks) to share information about the data.

A system and method described herein enables a user (e.g., a data scientist or data engineer) to import a library (e.g., a Python library) into a computer program under development (e.g., a data science notebook or Python script). The library enables the user to associate semantic annotations with data within a dataset. The library also leverages such semantic annotations to improve the productivity of the user and shorten time to value by simplifying common tasks, providing recommendations, and enabling easy collaboration across users. Each of these aspects/benefits will now be briefly described.

Simplifying Common Tasks. The library may include data manipulation and/or data analysis operations that leverage semantic annotations associated with data to simplify various tedious tasks such as automatically transforming data while joining heterogeneous datasets, enforcing semantic constraints and identifying data that violates them and cleaning/transforming data.

Providing Recommendations. The library may include functionality that examines the semantic annotations associated with one or more datasets and provides insights/suggestions to a user such as (a) automatically identifying relationships between various datasets, (b) suggesting interesting data visualizations, and (c) recommending feature functions when training a ML model.

Enabling Easy Collaboration Among Users. In certain implementations, the library may allow users to dynamically share knowledge about the data they are working with by semantically annotating the data themselves. Such semantic annotations may include descriptions of the data of as well as user-defined functions (e.g., cleaning, visualization and featurization functions) associated with a dataset. Through this capability, users do not need to rely on external tools (e.g., wikis or sharing Python notebooks as discussed above) to share information about the data.

In one embodiment, the aforementioned library comprises a Python library that provides a programming interface similar to the well-known Pandas library and is suitable for use within notebook experiences and Python scripts by data scientists. As noted above, the users can benefit from the capabilities of the library when the data contains semantic annotations. The annotations can either be populated through the library (manually or automatically) or can be loaded if the data is mapped to an existing semantic model such as Integrated Data Warehouse (IDW) or Common Data Model (CDM). In embodiments, the library is capable of operating on partially-annotated data as well. Thus, in accordance with such embodiments, the users can opt to annotate only the portions of the data that they care about.

Once the aforementioned library has been incorporated into a computer program under development, functionality within the library can then leverage the power of semantic annotations to improve the productivity of data scientists and reduce the time-to-value. Some non-limiting examples of ways in which the library can be employed to simplify and/or improve common tasks will now be described.

Helping to flatten normalized data. The library may include functionality that helps flatten normalized data (a common data science operation) by inferring how to join datasets based on the semantic annotations.

Suggest pivot and merge operations. The library may be employed to suggest how to pivot and merge datasets based on the semantic annotations.

Producing/suggesting data visualizations. The library may include functionality for producing/suggesting data visualizations based on the semantic annotations. For example, the library may include functionality that automatically determines how to geographically plot a column which is semantically annotated as "Address."

Validating arithmetic operations and joins. The library may include functionality that leverages semantic annotations to validate arithmetic operations (e.g., by determining that summing up phone numbers is an invalid operation) and joins (e.g., by checking relationships or checking for primary key (PK) joins).

Validating data. The library may include functionality that validates data based on predefined semantics. For example, such functionality may determine that a value represents CPU utilization based on a semantic annotation and then, in response to this determination, ensure that the value is in a range of 0 to 100%.

Suggesting featurization functions. The library may include functionality that can suggest featurization functions based on semantic annotations.

Suggesting cross-validation iterators. The library may include functionality that can suggest cross-validation iterators based on semantic annotations.

Providing visualizations for model debugging and/or model metrics. The library may include functionality that provides visualizations for model debugging and/or model metrics based on semantic types.

Knowledge sharing. In certain implementations, the library includes functionality that may be invoked by a user to dynamically share knowledge about the data as they are working with it. For example, by adding to or modifying a collection of semantic objects that may be referred to herein as a "knowledge base," data scientists can share semantic annotations and semantics-based user defined functions on top of existing datasets. For example, a data scientist can register a cleaning function for a dataset by creating or modifying a semantic object and her colleagues can choose to re-use the same function when operating on the same dataset.

By providing the foregoing functionality, the library enables user to carry out data manipulation and data analysis operations using fewer lines of code than when using the standard Pandas application programming interfaces (APIs).

FIG. 1 is a block diagram of a system 100 that may be used to conduct semantic aware data science using an implementation of the aforementioned library, according to an example embodiment. Depending upon the implementation, system 100 may be implemented on a single computing device or across multiple computing devices. A non-limiting example of a computing device that may be used to implement system 100 will be described below in reference to FIG. 14.

As shown in FIG. 1, system 100 includes an application 102, a library 104, and a data store 106. Application 102 comprises an application that is configured to enable a user thereof to develop and/or execute computer programs. As shown in FIG. 1, application 102 includes a user interface 112 and a computer program 114. Computer program 114 may comprise, for example and without limitation, a data science notebook or a script (e.g., a Python script). Through interaction with user interface 112, a user is enabled to create or load computer program 114, modify computer program 114 (e.g., by changing, adding or deleting lines of code within computer program 114), and execute computer program 114. Computer program 114 may comprise a computer program that is under development (e.g., a data science notebook that a user intends to modify). Alternatively, computer program 114 may comprise an already-developed computer program that is being accessed solely for the purpose of executing it (a data science notebook that a user wishes only to execute).

Through interaction with user interface 112, a user may insert one or more commands into computer program 114 that, when executed, cause library 104 to be imported into computer program 114. Alternatively, computer program 114 may already include such command(s) at the time computer program 114 is loaded by application 102. In any case, the importing of library 104 into computer program 114 enables commands of library 104 that are included within computer program 114 to be executed by application 102. As will be discussed below, at least one such command causes a dataset loaded by computer program 114 to be semantically annotated. Once a dataset has been semantically annotated, application 102 (e.g., an autocomplete feature of application 102) may then suggest (e.g., via user interface 112) a data manipulation or data analysis operation to a user based on the semantic annotations associated with the dataset. Furthermore, once a dataset has been semantically annotated, various semantic aware operations 134 within library 104 may be invoked from within computer program 114 to operate on the dataset. Such semantic aware operations 134 may be configured to infer at least one aspect associated with the execution thereof based on the semantic annotations associated with the dataset.

As further shown in FIG. 1, library 104 includes at least one data storage interface 116, a knowledge base 118, and operations 120. Data storage interface 116 comprises one or more commands that can be executed to access data stored in a data store. Such commands may be used, for example, by one or more operations within library 104 that create or load datasets based on such stored data. For example, computer program 114 may invoke an operation within library 104 that utilizes data storage interface 116 to load data 122 from data store 106 into working memory of application 102, such that it may be further acted on by computer program 114. Library 140 may include all the logic necessary to implement data storage interface 116. Alternatively, and as will be discussed below in reference to FIG. 2, library 104 may invoke data storage interface 116 by invoking a compute interface to a compute resource that is external to library 104, wherein the compute resource invokes data storage interface 116. In embodiments, data store 106 may be local or remote to a computing device that is executing application 102.

Knowledge base 118 comprises a collection of semantic objects 132 that collectively represent a semantic model. Knowledge base 118 may comprise a part of library 104 when library 104 is imported into computer program 114. Alternatively, and as will be discussed below in reference to FIG. 2, library 104 may include a metadata interface that can be invoked from within computer program 114 to load knowledge base 118 from a metadata store after library 104 has been imported therein. In one embodiment, multiple different knowledge bases may be available to a user, wherein each knowledge base comprises a semantic model that is associated with a particular domain or application. For example, there may be a knowledge base that represents sales data.

Operations 120 comprise data manipulation and/or data analysis operations that may be incorporated into computer program 114 and executed by application 102 after library 104 has been imported therein. As shown in FIG. 1, operations 120 may be categorized into two types of operations—namely, semantic aware operations 134 and non-semantic aware operations 136.

Semantic aware operations 134 include at least one operation that enables semantic objects 132 of knowledge base 118 to be associated with a dataset (e.g., a dataset comprising data 122), thereby generating a semantically-annotated dataset. Once a dataset has been semantically annotated, application 112 (e.g., autocomplete functionality of application 112) may then suggest (e.g., via user interface 112) a data manipulation or data analysis operation to a user based on the semantic annotations associated with the dataset. Semantic aware operations 134 may also include one or more data manipulation and/or data analysis operations that may be performed on a semantically-annotated dataset and that are configured to infer at least one aspect associated with the execution thereof based on the semantic annotations associated with the dataset.

Non-semantic aware operations 136 include one or more data manipulation and/or data analysis operations that are configured to operate on non-semantically-annotated datasets (e.g., datasets comprising only raw data).

Library 104 may include all the logic necessary for executing each of semantic aware operations 134 and/or each of non-semantic aware operations 136. Alternatively, one or more semantic aware operations 134 or non-semantic aware operations 136 may be performed, at least in part, by invoking operations of compute resources external to library 104 via various compute interfaces as will be discussed below in reference to FIG. 2.

Figure 2:
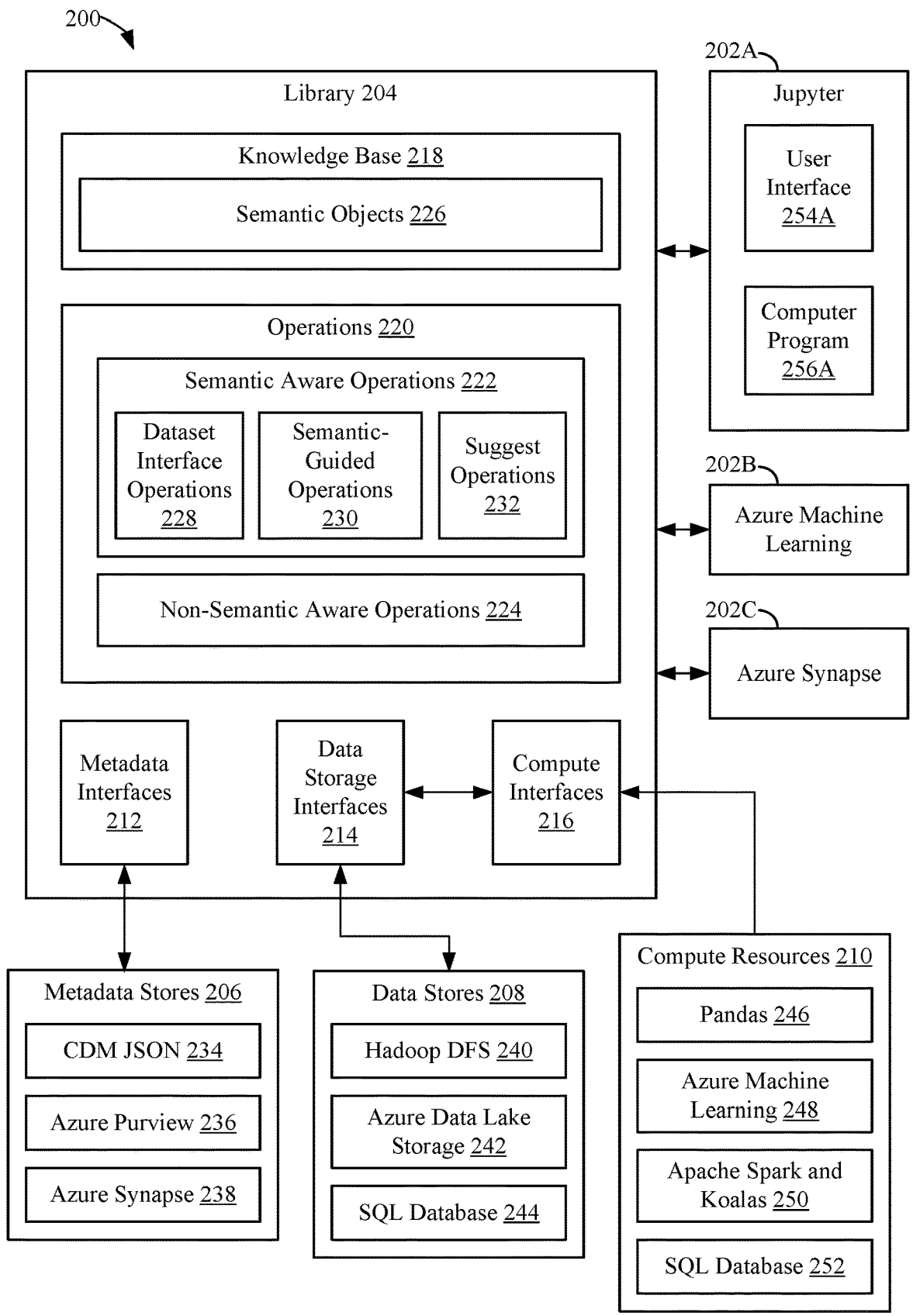
FIG. 2 is a block diagram of a system that may be used to conduct semantic aware data science, according to an example embodiment.

FIG. 2 is a block diagram of a system 200 that may be used to conduct semantic aware data science, according to an example embodiment. System 200 is a non-limiting example implementation of system 100 of FIG. 1. System 200 is described below with respect to system 100 of FIG. 1. Further structural and operational examples will be apparent to persons skilled in the relevant art(s) based on the following descriptions.

As shown in FIG. 2, system 200 includes a plurality of different applications for developing and/or executing a computer program (Jupyter® application 202A, Azure® Machine Learning (ML) application 202B, Azure Synapse application 202C), a library 204 for enabling semantic aware data science, a plurality of different metadata stores 206, a plurality of different data stores 208, and a plurality of different compute resources 210.

Jupyter application 202A, Azure ML application 202B, and Azure Synapse application 202C (collectively "applications 202") are each different examples of application 102 of FIG. 1. As shown in FIG. 2, Jupyter application 202A includes a user interface 254A, which is one example of user interface 112, and a computer program 256A, which is one example of computer program 114. While only user interface 254A and computer program 256A of Jupyter application 202A are shown in FIG. 2, it is to be understood that each of applications 202 include respective user interfaces and computer programs that are examples of user interface 112 and computer program 114 of FIG. 1, but are not shown in FIG. 2 for the sake of brevity.

As illustrated by FIG. 2, a plurality of different types of applications may leverage the semantic data science features of library 204. In particular, through interaction with each one of applications 202, a user may insert one or more commands into a respective computer program that, when executed, cause library 204 to be imported into the computer program. Library 204 and associated operations are discussed further below with respect to Jupyter application 202A. However, it is to be understood that each one of applications 202 may be utilized to import library 204 and carry out similar operations. Still other types of applications other than those shown in FIG. 2 may leverage the semantic data science features of library 204.

Library 204 is an example implementation of library 104 of FIG. 1, and, as shown in FIG. 2, includes metadata interfaces 212, data storage interfaces 214, compute interfaces 216, knowledge base 218, and operations 220.

Each metadata interface of metadata interfaces 212 comprises one or more commands that can be included in computer program 256A after library 204 has been imported therein that, when executed, enable computer program 256A to access metadata that is stored in a corresponding one of metadata stores 206. Each metadata store of metadata stores 206 may be local or remote to a computing device that is executing Jupyter application 202A. For example, a command of one of metadata interfaces 212 may be included in computer program 256A and executed to load metadata from a corresponding one of metadata stores 206 into working memory of Jupyter application 202A, such that it may be further acted on by computer program 256A.

Metadata stored in metadata stores 206 may include semantic objects (e.g., semantic objects 226), schemas, data model information, and/or any other information used to describe and/or organize data. In one embodiment, multiple metadata stores are made accessible to the user, and different metadata interfaces may be included in library 204 to access each. As shown in FIG. 2, metadata stores 206 may include a common data model (CDM) JSON store 234, an Azure Purview® store 236, and an Azure Synapse store 238. However, these examples are not intended to be limiting and still other metadata stores may be used. For instance, a GIT™ metadata store that includes a version control system may be used to store versioned metadata. Furthermore, metadata may be stored in metadata stores 206 as files in various formats (e.g., a JSON file format, an XML file format, a binary serialization file format, etc.). In certain embodiments, loading metadata from a particular metadata store may comprise transforming the metadata from a first format that is unsuitable for use by certain operations of library 104 to a second format that is suitable for use by such operations.

Data storage interfaces 214 comprises various implementations of data storage interface 116 of FIG. 1. Each of data storage interfaces 214 include one or more commands that, when executed, access data stored in a corresponding one of data stores 208. Such commands may be used, for example, by one or more operations within library 204 that create or load datasets based on such stored data. For example, computer program 256A may invoke an operation within library 204 that utilizes one of data storage interfaces 214 to load data from a corresponding one of data stores 208 into working memory of application 254A, such that it may be further acted on by computer program 256A. Data stores 208 represent different implementations of data store 106, and, as shown in FIG. 2, may include a Hadoop® distributed file system (Hadoop DFS) 240, an Azure Data Lake Storage 242, and a structured query language (SQL) database 244.

However, it is possible that other types of data stores may be accessed via data storage interfaces 214, such as Azure Blob storage.

Compute interfaces 216 comprise interfaces that enable calls to be made to compute resources that are external to library 204 to carry out operations that may be used to implement operations 220. For example, a command that can be included in computer program 256A after library 204 has been imported may, when executed, invoke an operation of one or more compute resources 210 external to library 204 via compute interfaces 216. Such operations may be used, for example, to invoke data storage interfaces 214 or perform, at least in part, one or more of operations 220. Compute interfaces 216 may enable calls to any number of or types of compute resources. For example, as shown in FIG. 2, compute interfaces 216 enable access to a Pandas compute resource 246, an Azure Machine Learning compute resource 248, an Apache Spark™ and Koalas compute resource 250, and a SQL database compute resource 252. Operations of compute resources 210 may be executed on the computing device that is executing Jupyter application 202A or another computing device, depending on the implementation.

Knowledge base 218 is an example implementation of knowledge base 118 of FIG. 1, and, as shown in FIG. 2, comprises a collection of semantic objects 226. Depending on the implementation, knowledge base 218 may comprise a part of library 204 at the time it is imported or, alternatively, knowledge base 218 may be subsequently loaded from one of metadata stores 206, in a manner described above with respect to metadata interfaces 212.

Operations 220 is an example implementation of operations 120 of FIG. 1, and, as shown in FIG. 2, includes semantic aware operations 222 and non-semantic aware operations 224. Semantic aware operations 222 are an example implementation of semantic aware operations 134 and non-semantic aware operations 224 are an example implementation of non-semantic aware operations 136.

As shown in FIG. 2, semantic aware operations 222 include dataset interface operations 228, semantic-guided operations 230, and suggest operations 232. Dataset interface operations 228 include at least one operation that enables semantic objects 226 of knowledge base 218 to be associated with a dataset, thereby generating a semantically-annotated dataset. For example, dataset interface operations 228 may include an operation that, when executed, automatically associate semantic objects 226 with a dataset, enable a user to associate semantic objects 226 with a dataset (e.g., via user interface 254A), suggest an association between semantic objects 226 and a dataset, and/or otherwise enable the generation of a semantically-annotated dataset.

Semantic-guided operations 230 includes one or more data manipulation and/or data analysis operations that may be performed on a semantically-annotated dataset and that are configured to infer at least one aspect associated with the execution thereof based on the semantic annotations associated with the dataset.

Suggest operations 232 are operations that, once a dataset has been semantically annotated, enable the suggestion of one or more data manipulation and/or data analysis operations to a user based on the semantic annotations associated with the dataset. For example, in accordance with an embodiment, suggest operations 232 enable Jupyter application 202A (e.g., an auto-complete function of Jupyter application 202A) to suggest (e.g., via user interface 254A) one or more data manipulation and/or data analysis operations to a user based on the semantic annotations associated with the dataset, as will be discussed below with respect to FIGS. 8 and 9.

In one example implementation, library 104 is configured to utilize its own internal knowledge base as a metadata store, Pandas as a compute backend and a local filesystem as a storage backend. However, in further accordance with such an implementation, a user may be able to override these settings as needed.

As noted above, semantic objects 226 of FIG. 2 collectively define a semantic model. In one example embodiment, the semantic model comprises an entity relationship model, although this example is not intended to be limiting and other types of models may be used. In a further embodiment, semantic objects 226 comprise instantiations of various different classes of an object-oriented programming language, such as Python. Each one of semantic objects 226 may have a unique identifier and description. As discussed above, knowledge base 218 may comprise a collection of semantic objects representing the semantic model associated with a particular domain/application (e.g., there may be a knowledge base representing sales data). In accordance with an embodiment, if a knowledge base is not provided when creating a semantic object, "current" knowledge may be used to identify a knowledge base (e.g., the last knowledge base accessed by a user, a global knowledge base, and/or the like). References between semantic objects may be expressed using the aforementioned unique identifiers to enable serialization and/or deserialization.

Figure 3:
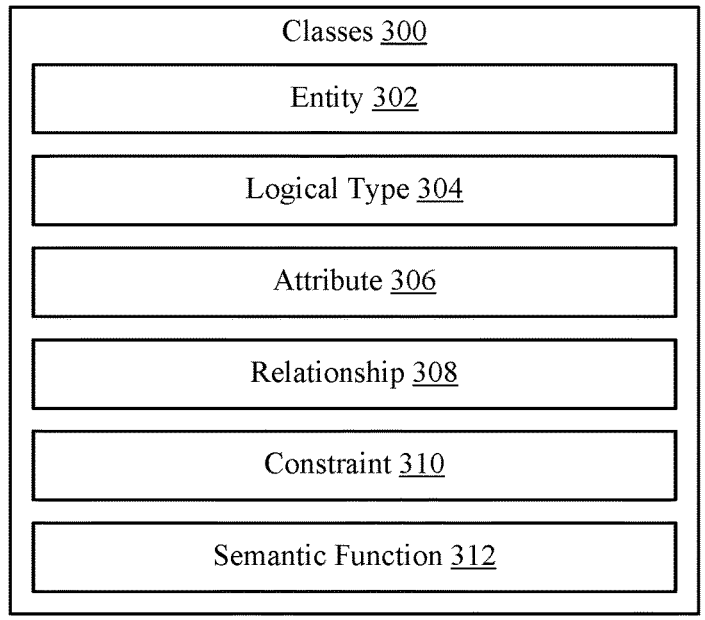
FIG. 3 depicts a set of example classes that may be used to instantiate semantic objects of a semantic model, according to an example embodiment.

In one example embodiment, semantic objects 226 comprise instantiations of a various classes 300 that are depicted FIG. 3. As shown in FIG. 3, classes 300 include entity 302, logical type 304, attribute 306, relationship 308, constraint 310, and semantic function 312. Descriptions of each of these classes in accordance with one example implementation will now be described. However, it will be appreciated that these descriptions are provided by way of example only and are not intended to be limiting.

Entity 302 is a named list of attributes, a list of constraints, and an optional fixed association with physical data in the form of a particular semantically-annotated dataset (e.g., Company entity).

Logical type 304 is a named reference to a base type (repr_type) together with a list of tags, a list of constraints, a list of components, and an optional single parsing function. Tags (properties/traits) are type indicators, and may include, for example "id", "numeric", "categorical", "time", "event". The parsing function is an element-wise (per-cell) function. Components are named sub-parts, each associated with a function to compute actual value, for extracting aspects from compound types like "Address" (e.g., Address logical type with components street, city, state).

Attribute 306 is a named reference to a logical type together with a list of constraints (e.g., company address attribute in Company entity).

Relationship 308 includes a name, from entity, to entity, from attribute and a to attribute (e.g., Admitted relationship with Patient from entity, Hospital to entity, PatientName from attribute, and PatientName to attribute).

Constraint 310 is a named elementwise function that returns a true or false indication (e.g., a Salary value should be positive, a CPU Utilization value is in a range of 0 to 100, a Salary of a Manager entity should be higher than a DirectReport entity). In accordance with an embodiment, a system may determine data is dirty if the data has values outside of the constraints (e.g., a CPU Utilization value that is out of range).

Semantic function 312 is a callable applicable to a semantically-annotated dataset together with an applicability filter that decides applicability based on the attributes of the semantically-annotated dataset, and optionally a suggest function to suggest potential invocations (e.g., suggest which attributes to pass as arguments, as discussed below with respect to FIG. 8 and FIG. 9). Example types of semantic functions include feature functions and plotting functions, though other types of functions may leverage annotations of a semantically-annotated dataset.

In the context of a semantic feature function, the semantic feature function applies a featurizer only to relevant columns of a semantically-annotated dataset based on the semantic annotations (e.g., a scaling semantic function applies scaling only to continuous columns of a semantically-annotated dataset and a one-hot-encoding semantic function applies one-hot-encoding only to categorical columns of a semantically-annotated dataset). The applicability filter of a semantic feature function is used to determine if the function is applicable to a semantically-annotated dataset (e.g., a semantic sliding window function includes an applicability filter that determines if a time series is present in a semantically-annotated dataset). In an embodiment, a built-in semantic feature function includes preprocessing for continuous and categorical data as well as time series featurization. The output of this built-in semantic feature function is not the actual features, but rather a pipeline (e.g., a scikit-learn compatible pipeline) that can evaluate the features within a ML pipeline (e.g., within a model selection context). This built-in semantic feature function may prevent data leakage from pre-computing features on a training and test set together.

In the context of a semantic plotting function, an applicability filter of the semantic plotting function is used to plot only relevant columns (e.g., plotting only addresses of a semantically-annotated dataset). In accordance with one example, the execution of a semantic plotting function may return a graph by invoking functions of a plotting library (e.g., Matplotlib) and/or utilizing visualization software (e.g., Graphviz).

Figure 4:
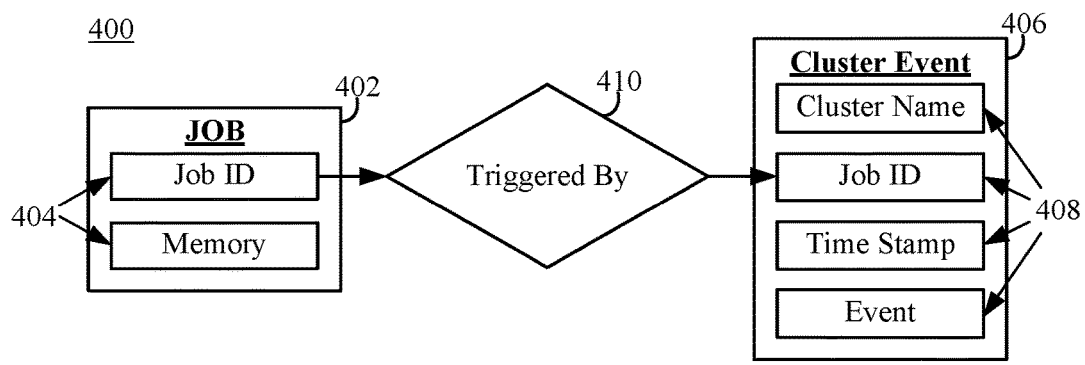
FIG. 4 depicts aspects of a semantic model that may be represented using semantic objects, according to an example embodiment.

As discussed above, semantic objects 226 may be used to represent a semantic model. To help illustrate this, FIG. 4 depicts aspects of an example semantic model 400 ("semantic model 400" hereafter) that may be represented using semantic objects 226. As shown in FIG. 4, semantic model 400 includes a job entity 402, a cluster event entity 406, and a relationship 410. Job entity 402 and cluster event entity 406 are example semantic object instantiations of entity class 302 of FIG. 3. Job entity 402 includes attributes 404 labeled "Job ID" and "Memory," each of which is represented by its own attribute semantic object instantiated from attribute class 306. Cluster event entity 406 includes attributes 408 labeled "Cluster Name", "Job ID", "Time Stamp", and "Event", each of which is also be represented by its own attribute semantic object instantiated from attribute class 306. Relationship 410 is an example instantiation of relationship class 308 and specifies that the Job ID attribute of cluster event entity 406 is triggered by the Job ID attribute of job entity semantic object 402.

Figure 5:
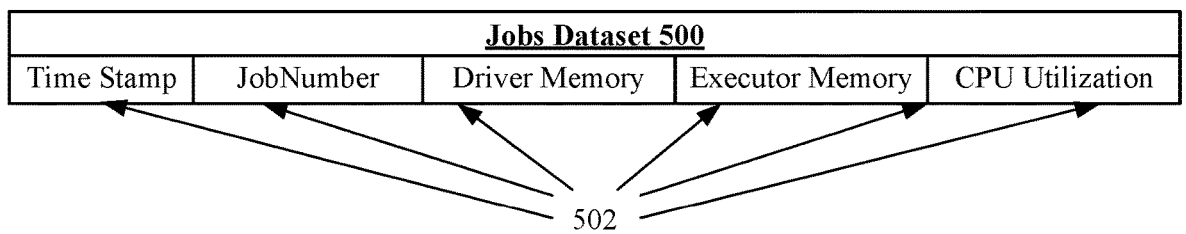
FIG. 5 depicts an example dataset with which semantic objects may be associated to produce a semantically-annotated dataset in accordance with an embodiment.

As discussed above with respect to FIG. 2, dataset interface operations 228 include operations that enable semantic objects of a knowledge base to be associated with a dataset, thereby generating a semantically-annotated dataset. A semantically-annotated dataset may comprise, for example, a semantically-annotated dataframe (SemanticDataFrame) or a semantically-annotated series (SemanticSeries). For example, FIG. 5 depicts an example dataset 500 with which semantic objects may be associated to produce a semantically-annotated dataset in accordance with an embodiment. Dataset 500 may be generated, for example, from data 122 of FIG. 1.

As shown in FIG. 5, dataset 500 includes columns 502 labeled "Time Stamp", "JobNumber", "Driver Memory", "Executor Memory", and "CPU Utilization". Operations of dataset interface operations 228, when executed, enable the generation of a semantically-annotated dataset by associating semantic objects of FIG. 4 to dataset 500. For instance, a user may invoke one or more operations of dataset interface operations 228 via user interface 254A to associate the Job ID attribute of job entity 402 with the JobNumber column of dataset 500 and the Memory attribute of job entity 402 with the Driver Memory and Executor Memory columns of dataset 500. Furthermore, other semantic objects not shown in FIG. 4 for the sake of brevity may be mapped to dataset 500. For example, a logical type "Computer Memory" may be associated with the Driver Memory and Executor Memory columns of dataset 500. Semantic tags of a logical type may enhance the semantic information of an attribute. For example, the JobID attribute of job entity 402 may include a tag "ID" that indicates that each value within the JobNumber column of dataset 500 is expected to be an identifier (ID).

Embodiments and techniques of the present disclosure may generate semantically-annotated datasets in various ways. For instance, with respect to FIG. 4 and FIG. 5 above, a user may invoke an operation of dataset interface operations 228 (e.g., via user interface 254A) to associate semantic objects with dataset 500, where dataset 500 may be obtained via one of data storage interfaces 214 from a corresponding one of data stores 208, and where the semantic objects may comprise a pre-existing knowledge base within library 204 or may be obtained via one of metadata interfaces 212 from a corresponding one of metadata stores 206. In a embodiment, a user may also generate, modify or delete one or more semantic objects (e.g., via user interface 254A).

The association of semantic objects with columns within a dataset may be carried out automatically (e.g., by simply specifying an entity with which a dataset should be associated) or by requiring the user to manually attach semantic annotations to an existing dataset (e.g., an existing DataFrame in Pandas or Koalas). This process may entail mapping of the dataset columns to attribute semantic objects in a knowledge base. In this case, there may be no entity associated with the semantically-annotated dataset.

A semantically-annotated dataset may be fully annotated or have columns without semantic annotations (e.g., not associated with an attribute in the knowledge base). A user may apply operations 220 to the semantically-annotated dataset (e.g., by invoking semantic aware operations 222 and/or non-semantic aware operations 224). For example, a user may invoke one or more of non-semantic aware operations 224 (e.g., Pandas operations) on the semantically-annotated dataset. Furthermore, a user may invoke one or more of semantic-guided operations 230. For example, a user may invoke a semantic-guided operation that is similar to a Pandas API call but with fewer inputs from the user (e.g., a semantic-guided merge operation that does not require a user to specify of a join key).

III. Example Semantic-Guided Operations Embodiments

Figure 6:
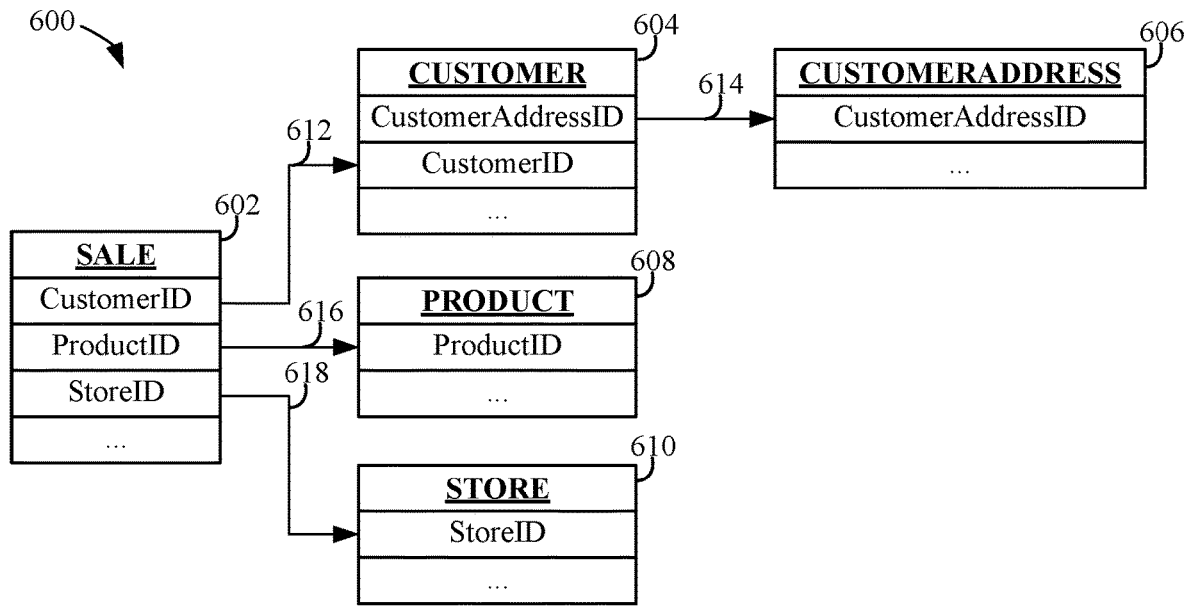
FIG. 6 depicts aspects of a semantic model, according to an example embodiment.

Embodiments and techniques of the present disclosure enable the performance of semantic-guided operations. Such semantic-guided operations may be implemented in various ways. The following examples are described with respect to FIG. 6. FIG. 6 illustrates various aspects of a semantic model 600, according to an example embodiment. Semantic model 600 is described below with continued reference to system 200 of FIG. 2.

As shown in FIG. 6, semantic model 600 includes a sale entity 602, a customer entity 604, a customer address entity 606, a product entity 608, and a store entity 610 (collectively "entities 602-610"). Sale entity 602 includes attributes labeled "CustomerID", "ProductID", and "StoreID". Customer entity 604 includes attributes labeled "CustomerAddressID" and "CustomerID". Customer address entity 606 includes an attribute labeled "CustomerAddressID". Product entity 608 includes an attribute labeled "ProductID". Store entity 610 includes an attribute labeled "StoreID". Any of entities 602-610 may include additional attributes, not shown in FIG. 6 for the sake brevity, as indicated by respective ellipses.

Semantic model 600 further includes relationships between attributes of entities 602-610. In particular, relationship 612 indicates a relationship between the CustomerID attribute of sale entity 602 and the CustomerID attribute of customer entity 604, relationship 614 indicates a relationship between the CustomerAddressID attribute of customer entity 604 and the CustomerAddressID attribute of customer address entity 606, relationship 616 indicates a relationship between the ProductID attribute of sale entity 602 and the ProductID attribute of product entity 608, and relationship 618 indicates a relationship between the StoreID attribute of sale entity 602 and the StoreID attribute of store entity 610.

Figure 7:
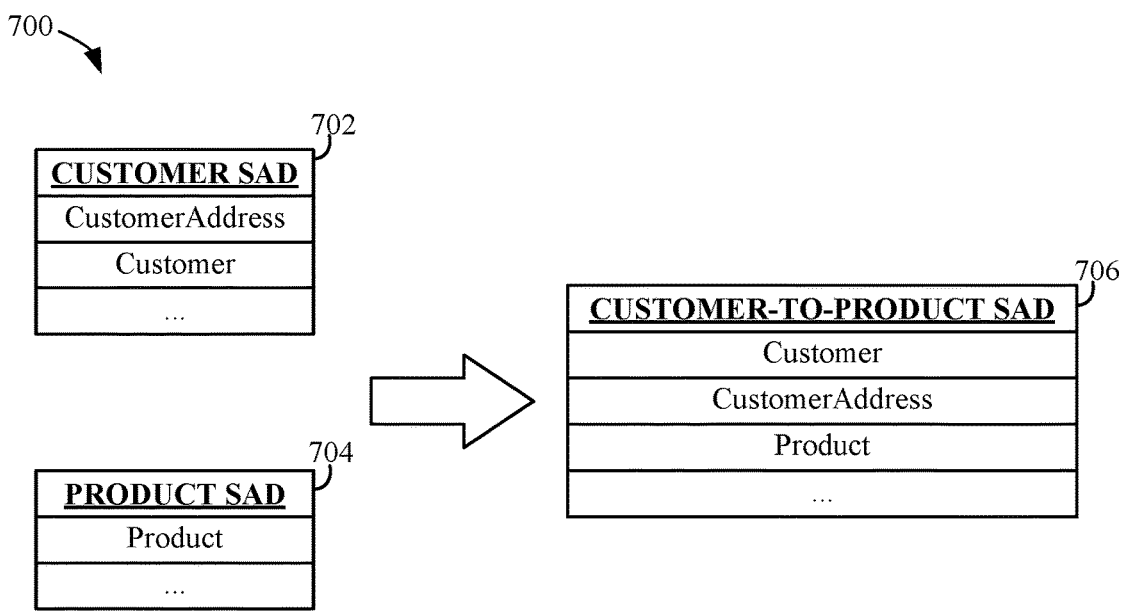
FIG. 7 illustrates an example merge operation that may be performed on datasets that have been annotated with semantic metadata of the semantic model of FIG. 6, according to an example embodiment.

As explained above, semantic objects of semantic model 600 may be associated with one or more datasets to generate one or more semantically-annotated datasets. A semantic-guided operation may then be invoked or suggested that utilizes the one or more semantically-annotated datasets to infer at least one aspect of a data manipulation or data analysis operation to be performed on the one or more semantically-annotated datasets. For example, FIG. 7 illustrates an example merge operation 700 that may be performed on datasets that have been annotated with semantic metadata of semantic model 600 of FIG. 6, according to an example embodiment. Merge operation 700 is described below with continue reference to system 200 of FIG. 2 and semantic model 600 of FIG. 6.

As shown in FIG. 7, merge operation 700 involves merging a customer semantically-annotated dataset 702 ("customer SAD 702" hereafter) and a product semantically-annotated dataset 704 ("product SAD 704" hereafter) to generate a customer-to-product semantically-annotated dataset 706 ("CTP SAD 706" hereafter). Customer SAD 702 and product SAD 704 are generated via techniques for generating semantically-annotated datasets described herein (e.g., as described with respect to FIG. 4 and FIG. 5 above). For instance, a user may invoke code of dataset interface operations 228 (e.g., via user interface 254A) to associate customer entity 604 and its attributes with a customer dataset to generate customer SAD 702 and associate product entity 608 and its attributes with a product dataset to generate product SAD 704. As shown in FIG. 7, customer SAD 702 includes a column labeled CustomerAddress associated with the CustomerAddressID attribute of customer entity 604 and a column labeled Customerassociated with the CustomerID attribute of customer entity 604, and product SAD 704 includes a column labeled Product associated with the ProductID attribute of product entity 608.

A user may invoke a merge operation of semantic-guided operations 230 of FIG. 2 (e.g., via user interface 254A) to perform merge operation 700. The execution of merge operation 700 utilizes semantic annotations of customer SAD 1002 and product SAD 1004 to infer a join path by which to merge columns of the datasets based at least on relationship 612 between customer entity 604 and sale entity 602 and relationship 616 between product entity 608 and sale entity 602. For example, the semantic annotations may be used to infer that customer SAD 702 should be merged with a sale SAD (not shown in FIG. 7 for the sake of brevity) using the column labeled Customer as the join key, and that the sale SAD should be joined with product SAD 704 using the column labeled Product as the join key. In this way, the execution of merge operation 700 merges customer SAD 702 with product SAD 704 to generate CTP SAD 706. CTP SAD 706 includes columns labeled Customer, which corresponds to the Customer column of customer SAD 702, CustomerAddress, which corresponds to the CustomerAddress column of customer SAD 702, and Product, which corresponds to the Product column of product SAD 704.

Since the join path for the merge operation can be inferred from the semantic annotations, the user need only specify which datasets they wish to merge and the system can carry out the merge by determining the appropriate join path and join keys. In contrast, using a tool like Pandas that does not include any concept of semantically-annotated datasets, the user would have to manually join all of the datasets (customer SAD 702, store SAD, product SAD 704), specifying join keys along the way. Thus, the present system enables much more efficient coding of data science operations.

When a user performs an operation on a semantically-annotated dataset, such as merge operation 700, semantic annotations of the inputs of the operation may be propagated to the output of the operation. In this way, data manipulation and/or data analysis operations may leverage semantic optimizations even when operating on derived data. In an embodiment, semantic annotations are propagated to the remaining columns in a semantically-annotated dataset after an operation has been performed. For example, the Customer, Customer Address, and Product columns of CTP SAD 706 will be automatically mapped to the CustomerID attribute of customer entity 604, the CustomerAddressID attribute of customer entity 604, and the ProductID attribute of product entity 608, respectively. In an example implementation where a new column is created as a result of the operation, new attributes representing the semantic annotations of the input may be associated with the new column. For example, in a group by aggregate query implementation, a new column representing the sum of the values of a column is created. In this example, a new attribute is created in the knowledge base with an appropriate name and logical type and is associated with the new column. In one embodiment, new attributes are generated in a "best-effort" fashion (e.g., for join and aggregation operations performed on a semantically-annotated dataframe, for logical operations performed on a semantically-annotated data series, and/or the like).

IV. Example Suggest Operations Embodiments

Embodiments of the present disclosure include techniques for suggesting data manipulation and/or data analysis operations to a user. For instance, as discussed above with respect to semantic function 312 of FIG. 3, a semantic function includes an applicability filter. In an embodiment, the applicability filter of a semantic function is used to populate automatic suggestions for featurization, visualization and processing. For instance, Jupyter application 202A of FIG. 2 may include an auto-complete function that leverages suggest operations 232 to suggest semantic functions based on runtime semantic annotations of a semantically-annotated dataset. For example, for a semantically-annotated dataset sdf, featurization suggestions may be accessed by a user inputting "sdf.featurize" in user interface 254A, plotting suggestions may be accessed by "sdf.plot", and other processing via "sdf.auto".

An auto-complete function may present suggestions to a user in various ways, in embodiments. For instance, FIG. 8 is an example user interface window 800 ("UI window 800" hereafter) displaying a suggestion of plot operations, according to an example embodiment. In an embodiment, user interface 254A of FIG. 2 includes UI window 800. UI window 800 is described below with respect to system 200 of FIG. 2.

Figure 8:
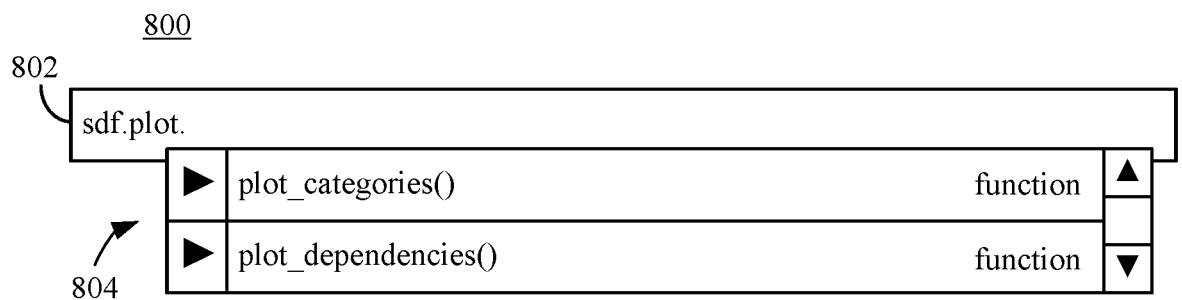
FIG. 8 is an example user interface window displaying suggestions of plot operations, according to an example embodiment.

As shown in FIG. 8, UI window 800 includes a text entry window 802 and a dropdown menu 804. In this example embodiment, a user is accessing a semantically-annotated dataset "sdf" and enters "sdf.plot." in text entry window 802. The auto-complete function determines semantic functions to suggest and displays the suggestions in dropdown menu 804. For example, the auto-complete function determines, via suggest operations 232 of FIG. 2 and semantic annotations of sdf, that sdf includes categorical variables and dependencies. In this context, and as shown in FIG. 8, the auto-complete function displays a first plot suggestion "plot_categories( )" and a second plot suggestion "plot_dependencies( )" in dropdown menu 804. A user may select a suggested plot operation from dropdown menu 804 to be performed on sdf.

In embodiments, suggestions presented to a user may include one or more suggested arguments of a data manipulation or data analysis operation. For example, FIG. 9 is an example user interface window 900 ("UI window 900" hereafter) displaying a suggestion of operations including suggestions of one or more arguments of the operations, according to an example embodiment. In an embodiment, user interface 254A of FIG. 2 includes UI window 900. UI window 900 is described below with continued reference to system 200 of FIG. 2.

Figure 9:
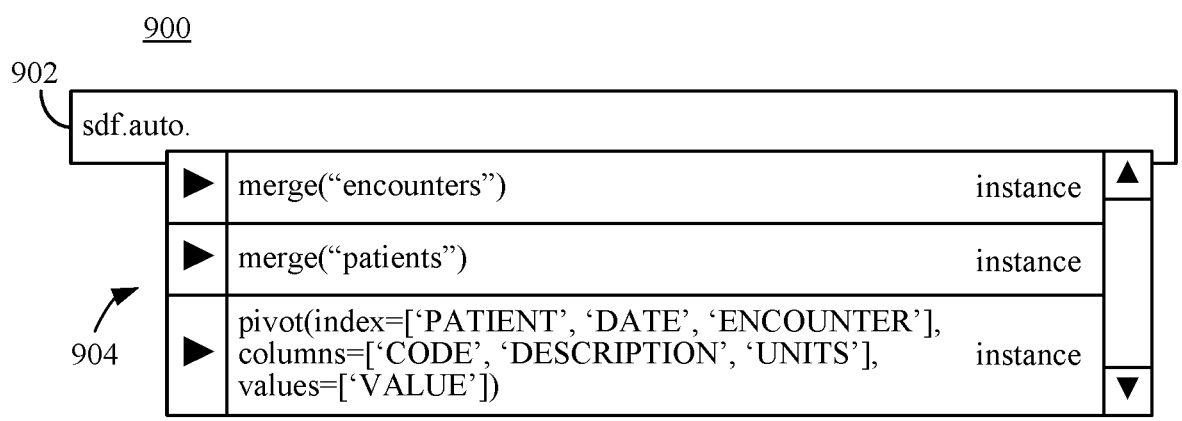
FIG. 9 is an example user interface window displaying suggestions of operations including suggestions of one or more arguments of the operations, according to an example embodiment.

As shown in FIG. 9, UI window 900 includes a text entry window 902 and a dropdown menu 904. In this example embodiment, a user is accessing a semantically-annotated dataset "sdf" and enters "sdf.auto." in text entry window 902. The auto-complete function determines semantic functions to suggest and displays the suggestions in dropdown menu 904. For example, the auto-complete function determines, via suggest operations 232 of FIG. 2 and semantic annotations of sdf, that sdf is associated with an entity that has a relationship with an "encounters" entity and a "patients" entity. In this context, and as shown in FIG. 9, the auto-complete function displays a first merge suggestion "merge ("encounters")" and a second merge suggestion "merge ("patients")" in dropdown menu 904. Furthermore, the auto-complete function determines operations that may be performed on sdf and arguments of the operation. For example, the auto-complete function determines a "pivot" function may be performed on sdf and suggests arguments of the pivot function (e.g., pivot parameters index, columns, and values), as shown in dropdown menu 904 of FIG. 9.

V Example Method Embodiments

Figure 10:
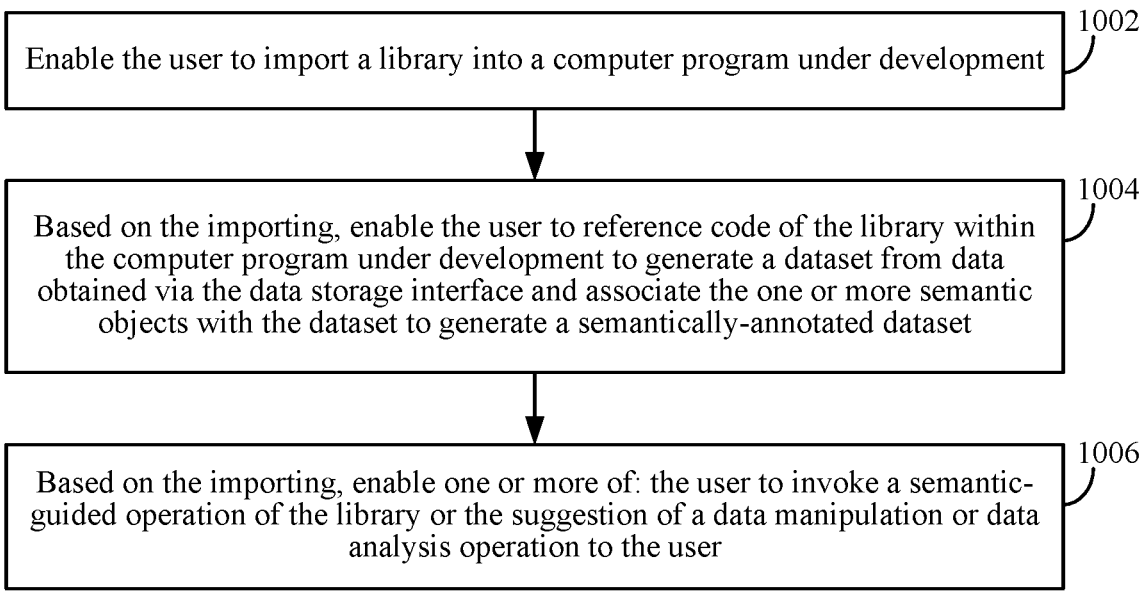
FIG. 10 is a flowchart of a process for enabling semantic aware data science, according to an example embodiment.

Embodiments and techniques of the present disclosure include methods for semantic aware data science. For instance, system 100 of FIG. 1 may operate in various ways, in embodiments. For example, FIG. 10 is a flowchart 1000 of a process for enabling semantic aware data science, according to an example embodiment. In an embodiment, system 100 may operate to perform one or all of the steps of flowchart 1000. Flowchart 1000 is described as follows with respect to system 100 of FIG. 1 and system 200 of FIG. 2. Further structural and operational embodiments will be apparent to persons skilled in the relevant art(s) based on the following description. Note that not all steps of flowchart 1000 need to be performed in all embodiments.

Flowchart 1000 begins with step 1002. In step 1002, an application enables a user to import a library into a computer program under development. The library includes a data storage interface, one or more semantic objects, and one or more data manipulation or data analysis operations. For example, through interaction with user interface 112 of FIG. 1, a user may insert one or more commands into computer program 114 that, when executed, cause library 104 to be imported into computer program 114. Alternatively, computer program 114 may already include such command(s) at the time computer program 114 is loaded by application 102.

In step 1004, the importing enables the user to reference code of the library within the computer program under development to generate a dataset from data obtained via the data storage interface and associate the one or more semantic objects with the dataset to generate a semantically-annotated dataset. For instance, the user may reference code of data storage interface 116 within computer program 114 to obtain data 122 via data storage interface 116. Alternatively, a user may obtain data 122 by invoking one of data storage interfaces 214 via a compute interface (e.g., one of compute interfaces 216) to a compute resource that is external to library 104 (e.g., one of compute resources 210). The dataset may be generated from data 122 by invoking code of library 104 (e.g., data interface operations 228) and/or invoking a compute interface (e.g., one of compute interfaces 216) to a compute resource that is external to library 104 (e.g., one of compute resources 210).

In step 1006, the importing enables one or more of: the user to invoke a semantic-guided operation of the library or the suggestion of a data manipulation or data analysis operation to the user. For example, in one aspect of step 1006, a user may invoke one or more operations of semantic-guided operations 230 of FIG. 2 that utilizes the semantically-annotated dataset generated in step 1004 to infer at least one aspect of a data manipulation or data analysis operation to be performed on the semantically-annotated dataset (e.g., as described above with respect to the example merge operation 700 of FIG. 7). In another aspect of step 1006, Jupyter application 202A (e.g., an auto-complete function of Jupyter application 202A) may suggest (e.g., via user interface 254A) one or more data manipulation and/or data analysis operations to a user based on the semantically-annotated dataset (e.g., as described above with reference to the examples of FIG. 8 and FIG. 9).

Figure 11:
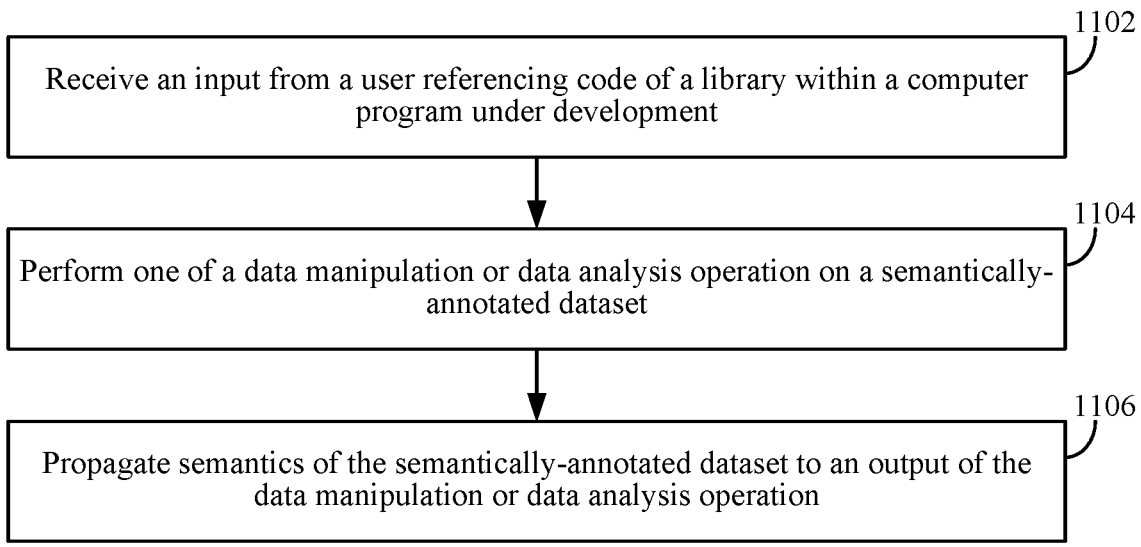
FIG. 11 is a flowchart of a process for propagating semantics of a semantically-annotated dataset, according to an example embodiment.

Note that semantics of a semantically-annotated dataset may be propagated in various ways, in embodiments. For example, FIG. 11 is a flowchart 1100 of a process for propagating semantics of a semantically-annotated dataset, according to an example embodiment. In an embodiment, system 100 of FIG. 1 may operate to perform one or all of the steps of flowchart 1100. Flowchart 1100 is described as follows with respect to system 100 of FIG. 1, system 200 of FIG. 2, semantic model 600 of FIG. 6, and merge operation 700 of FIG. 7. Further structural and operational embodiments will be apparent to persons skilled in the relevant art(s) based on the following description. Note that not all steps of flowchart 1100 need to be performed in all embodiments.

Flowchart 1100 starts with step 1102. In step 1102, an input is received from a user referencing code of a library within a computer program under development. For instance, a user may reference code (e.g., via user interface 112 of FIG. 1) within computer program 114. For example, the user may reference code of semantic-guided operations 230 of FIG. 2 to perform merge operation 700, as described above with respect to FIG. 7.

In step 1104, a data manipulation or data analysis operation is performed on a semantically-annotated dataset. For instance, the computing device that is executing application 102 of FIG. 1 may execute a data manipulation and/or data analysis operation of operations 120 to perform the operation on the semantically-annotated dataset. For example, a computing device executing application 102 may execute merge operation 700 of FIG. 7 to perform the operation on customer SAD 702 and product SAD 704.

In step 1106, semantics of the semantically-annotated dataset are propagated to an output of the data manipulation or data analysis operation. For example, with respect to FIG. 7, semantics of customer SAD 702 and product SAD 704 are propagated to CTP SAD 706. In this example, CTP SAD 706 is associated with Customers entity 604 and Products entity 608. For instance, the "Customer" column of CTP SAD 706 includes relationship 612 to the CustomerID attribute of Sales entity 602, the "CustomerAddress" column includes relationship 614 to the CustomerAddressID attribute of CustomerAddresses entity 606, and the "Product" column includes relationship 616 to the ProductID attribute of Sales entity 602.

Figure 12:
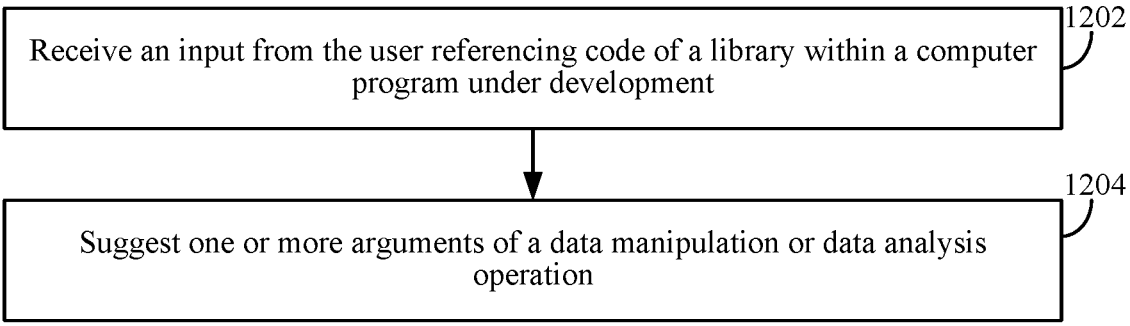
FIG. 12 is a flowchart of a process for suggesting one or more arguments of a data operation, according to an example embodiment.

Note that suggestions of one or more data manipulation and/or data analysis operations may be suggested to a user in various ways, in embodiments. For instance, FIG. 12 is a flowchart 1200 of a process for suggesting one or more arguments of a data operation, according to an example embodiment. In an embodiment, application 102 of FIG. 1 may operate to perform one or all of the steps of flowchart 1200. Flowchart 1200 is described as follows with respect to system 100 of FIG. 1, system 200 of FIG. 2, and UI window 900 of FIG. 9. Further structural and operational embodiments will be apparent to persons skilled in the relevant art(s) based on the following description. Note that not all steps of flowchart 1200 need to be performed in all embodiments.

Flowchart 1200 begins with step 602. In step 602, an input is received from a user referencing code of a library within a computer program under development. For instance, a user (e.g., via user interface 112) may reference code of library 104 within computer program 114. In one embodiment, the input is a portion of a call that invokes a suggest operations 232 (e.g., sdf.auto, sdf.plot, sdf.featurize), as described above with respect to FIG. 8 and FIG. 9.

In step 604, one or more arguments of a data manipulation or data analysis operation are suggested. For example, an auto-complete function of Jupyter application 202A utilizes suggest operations 232 and semantic annotations of semantically-annotated dataset sdf to determine that sdf is associated to an entity semantic object that is related to an encounters entity semantic object and a patients entity semantic object. In this example, the auto-complete function of Jupyter application 202A suggests a merge operation with "encounters" as an argument and a merge operation with "patients" as an argument, as shown and described with respect to FIG. 9. Furthermore, the auto-complete function of Jupyter application 202A suggests a pivot operation as well as the index, columns, and values parameters of the pivot operation, as shown and described with respect to FIG. 9.

Figure 13:
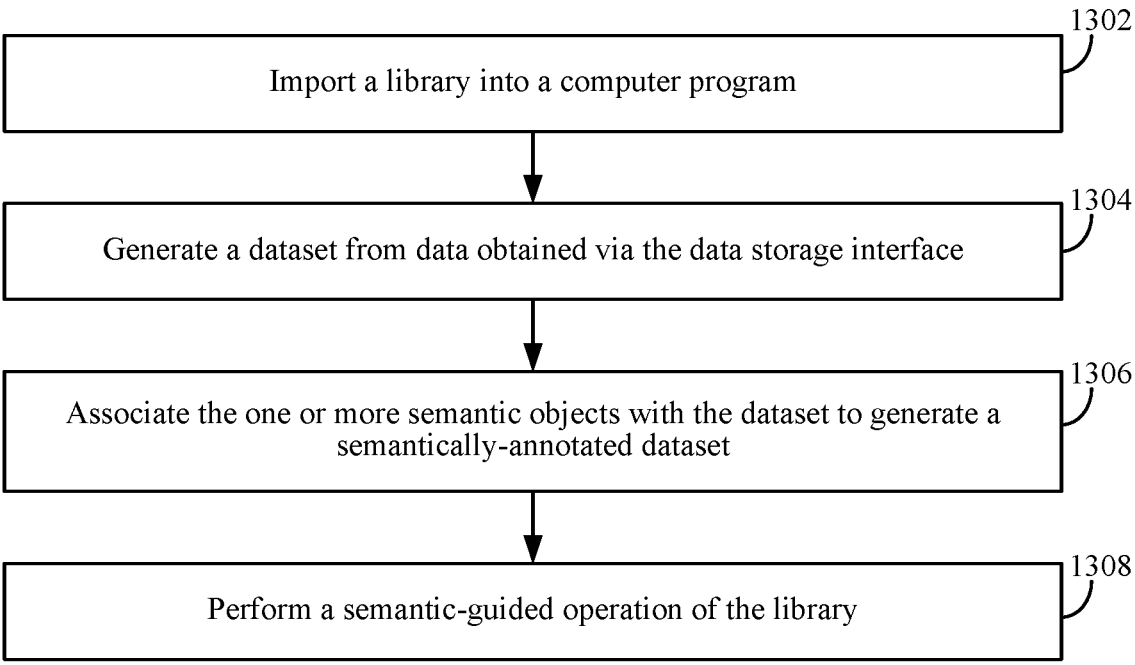
FIG. 13 is a flowchart of a process for performing a semantic-guided operation, according to an example embodiment.

As described with respect to computer program 114, a computer program may comprise an already-developed computer program that is being accessed solely for the purpose of executing it. For instance, a computing device may execute a computer program to perform a semantic-guided operation. For example, FIG. 13 is a flowchart 1300 of a process for performing a semantic-guided operation, according to an example embodiment. In an embodiment, computer program 114 includes code that, when executed by a computing device, performs one or all of the steps of flowchart 1300. Flowchart 1300 is described as follows with respect to system 100 of FIG. 1 and system 200 of FIG. 2. Further structural and operational embodiments will be apparent to persons skilled in the relevant art(s) based on the following description. Note that not all steps of flowchart 1300 need to be performed in all embodiments.

Flowchart 1300 starts with step 1302. In step 1302, a library is imported into a computer program. The library includes a data storage interface, one or more semantic objects, and one or more data manipulation or data analysis operations. For instance, a computing device executes computer program 114 to import library 104 into computer program 114.

In step 1304, a dataset is generated from data obtained via a data storage interface. For example, in accordance with an embodiment, data 122 is obtained from data store 106 by executing code of data storage interface 116. Alternatively, execution of computer program 114 may invoke data storage interface 116 by invoking a compute interface (e.g., one of compute interfaces 216) to a compute resource that is external to library 104 (e.g., one of compute resources 210). The dataset may be generated from data 122 by invoking code of library 104 (e.g., data interface operations 228) and/or invoking a compute interface (e.g., one of compute interfaces 216) to a compute resource that is external to library 104 (e.g., one of compute resources 210).

In step 1306, one or more semantic objects are associated with the dataset to generate a semantically-annotated dataset. For example, execution of computer program 114 invokes one or more operations of dataset interface operations 228 to associate one or more of semantic objects 226 with the dataset generated in step 1304.

In step 1308, a semantic-guided operation of the library is performed. The semantic-guided operation utilizes the semantically-annotated dataset generated in step 1306 to infer at least one aspect of a data manipulation or data analysis operation to be performed on the semantically-annotated dataset. For instance, execution of computer program 114 invokes one or more of semantic-guided operations 230 to be performed on the semantically-annotated dataset generated in step 1306.

VI. Further Example Embodiments and Advantages

As noted above, systems and devices may be configured in various ways for enabling the generation and/or utilization of semantically-annotated datasets. Example embodiments have been described with respect to libraries that access metadata stores, data stores, and compute resources, however, it is also contemplated herein that a library may include metadata, datasets, and compute logic. For example, a library may be a "content pack" that includes the library and predetermined metadata. For instance, a healthcare content pack may include a healthcare library and metadata (e.g., semantic objects) corresponding to patients, hospitals, and operations.

Embodiments of the present disclosure have been described with respect to manual, automatic, and a mixture of manual and automatic (i.e., "semi-automatic") semantic annotation. Automatic and semi-automatic semantic annotation may be implemented in various ways. For instance, a data analysis baseline library (DABL) may be used to infer properties of data (e.g., categorical data versus numerical data) in a dataset. Furthermore, logical types and attributes may be automatically or semi-automatically generated for a dataset based on the DABL. In one embodiment, candidate relationships between entities may be suggested to a user (e.g., via user interface 112) based on overlapping values, discovering functional dependencies, and/or other techniques for determining potential relationships between entities. In accordance with an embodiment, a user may update or otherwise modify the suggested semantic annotations.

Knowledge bases may be static or updatable, depending on the particular implementation. For instance, a static knowledge base may be utilized to prevent overwriting over semantic objects. In applications utilizing an updatable knowledge base, semantic objects may be updated, created, removed, and/or otherwise modified by a user. For instance, a user may create entities, define relationships between entities, define semantic functions, and/or otherwise expand semantic objects of a knowledge base. Moreover, a user may write program code for performing one or more data manipulation and/or data analysis operations that utilize one or more semantically-annotated datasets. In this context, the user may store the program code as part of the knowledge base so that other users may implement the program code. In this way, multiple users may develop code with respect to data and an associated knowledge base.

Metadata stores configured to store the knowledge base may include a version control system (e.g., the distributed version control system of Git), in embodiments. In this context, a user may update the knowledge base and persist the updates back to the metadata store. The version control system tracks each modification to the knowledge base and enables previous versions of the knowledge base to be restored. In accordance with an embodiment, the version control system includes a conflict resolution function for identifying and/or resolving conflicts between versions of the knowledge base. For example, if more than one user modifies a semantic object, the conflict resolution function identifies and flags the conflict to the users.

Embodiments and techniques have been described with respect to a knowledge base that is shareable between users, however, it is contemplated herein that a local version of a knowledge base may be used. In this context, a user may manipulate the local version of the knowledge base. Depending on the implementation, the user may or may not persist the local version of the knowledge base to a metadata store to be shared with other users. For instance, a user may create a local version of a knowledge base, modify the local version for a use case, and store the local version in a local metadata store. In this way, the user may utilize a modified local version of a knowledge base without overriding the original knowledge base.

Moreover, according to the described embodiments and techniques, any components of applications, computer programs, computer programs under development, and/or libraries and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

VII. Example Computer System Implementations

System 100, application 102, library 104, data store 106, user interface 112, computer program 114, data storage interface 116, knowledge base 118, operations 120, semantic objects 132, semantic aware operations 134, non-semantic aware operations 136, system 200, Jupyter application 202A, Azure ML application 202B, Azure Synapse application 202C, library 204, metadata stores 206, data stores 208, compute resources 210, metadata interfaces 212, data storage interfaces 214, compute interfaces 216, knowledge base 218, operations 220, semantic aware operations 222, non-semantic aware operations 224, semantic objects 226, dataset interface operations 228, semantic-guided operations 230, suggest operations 232, CDM JSON store 234, Azure Purview store 236, Azure Synapse store 238, Hadoop DFS 240, Azure Data Lake Storage 242, SQL database 244, Pandas compute resource 246, Azure ML compute resource 248, Apache Spark and Koalas compute resource 250, SQL database 252, user interface 254A, computer program 256A, classes 300, semantic model 400, dataset 500, semantic model 600, UI window 800, UI window 900, flowchart 1000, flowchart 1100, flowchart 1200, and/or flowchart 1300 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
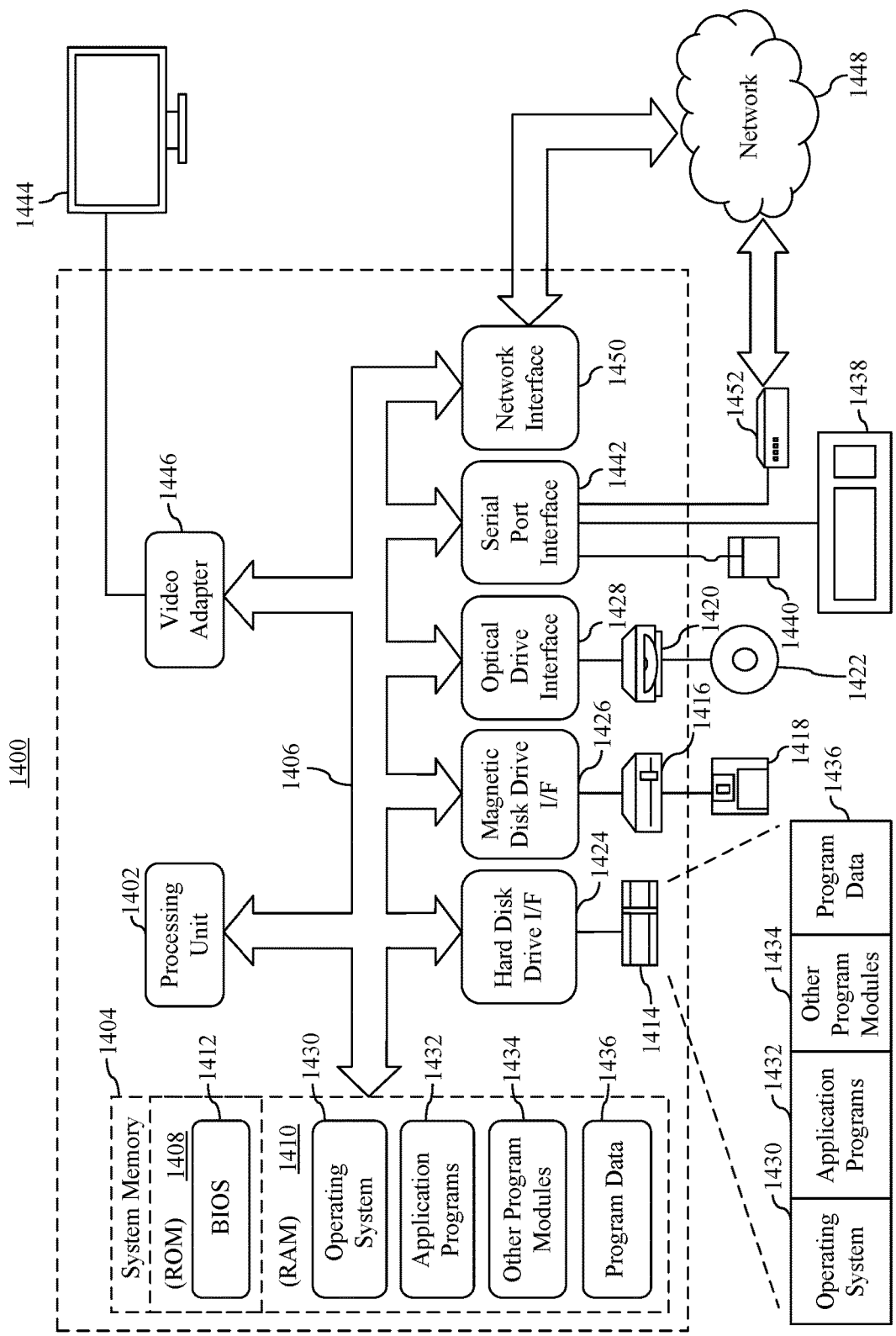
FIG. 14 is a block diagram of an example computer system that may be used to implement embodiments.

FIG. 14 depicts an exemplary implementation of a computer system 1400 ("system 1400" herein) in which embodiments may be implemented. For example, system 1400 may be used to implement system 100, application 102, library 104, data store 106, user interface 112, computer program 114, data storage interface 116, knowledge base 118, operations 120, semantic objects 132, semantic aware operations 134, and/or non-semantic aware operations 136, as described above in reference to FIG. 1. System 1400 may also be used to implement system 200, Jupyter application 202A, Azure ML application 202B, Azure Synapse application 202C, library 204, metadata stores 206, data stores 208, compute resources 210, metadata interfaces 212, data storage interfaces 214, compute interfaces 216, knowledge base 218, operations 220, semantic aware operations 222, non-semantic aware operations 224, semantic objects 226, dataset interface operations 228, semantic-guided operations 230, suggest operations 232, CDM JSON store 234, Azure Purview store 236, Azure Synapse store 238, Hadoop DFS 240, Azure Data Lake Storage 242, SQL database 244, Pandas compute resource 246, Azure ML compute resource 248, Apache Spark and Koalas compute resource 250, SQL database 252, user interface 254A, and/or computer program 256A, as described above in reference to FIG. 2. System 1400 may also be used to implement UI window 800, as described above in reference to FIG. 8. System 1400 may also be used to implement UI window 900, as described above in reference to FIG. 9. System 1400 may also be used to implement any of the steps of any of the flowcharts of FIGS. 10-13, as described above. System 1400 may also be used to implement any associations, developments, enabling, generating, importations, invocations, mappings, merges, obtaining, operations, propagations, references, storage, suggestions, and/or the like associated with embodiments of FIGS. 3-7. The description of system 1400 provided herein is provided for purposes of illustration and is not intended to be limiting. Embodiments may be implemented in further types of computer systems, as would be known to persons skilled in the relevant art(s).

As shown in FIG. 14, system 1400 includes one or more processors, referred to as processor unit 1402, a system memory 1404, and a bus 1406 that couples various system components including system memory 1404 to processor unit 1402. Processor unit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor unit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random-access memory (RAM) 1410. A basic input/output system 1412 (BIOS) is stored in ROM 1408.

System 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to perform any or all the functions and features of application 102, library 104, user interface 112, computer program 114, data storage interface 116, knowledge base 118, operations 120, semantic objects 132, semantic aware operations 134, non-semantic aware operations 136, Jupyter application 202A, Azure ML application 202B, Azure Synapse application 202C, library 204, compute resources 210, metadata interfaces 212, data storage interfaces 214, compute interfaces 216, knowledge base 218, operations 220, semantic aware operations 222, non-semantic aware operations 224, semantic objects 226, dataset interface operations 228, semantic-guided operations 230, suggest operations 232, Pandas compute resource 246, Azure ML compute resource 248, Apache Spark and Koalas compute resource 250, SQL database 252, user interface 254A, computer program 256A, UI window 800, UI window 900, flowchart 1000, flowchart 1100, flowchart 1200, and/or flowchart 1300 (including any steps of flowcharts 1000, 1100, 1200, and/or 1300).

A user may enter commands and information into the system 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor unit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in, system 1400. Display screen 1444 may display information, as well as being a user interface for receiving user commands and/or other information (e.g., by touch, finger gestures, virtual keyboard, etc.). For example, display screen 1444 may be configured to display semantic model 400 of FIG. 4, dataset 500 of FIG. 5, semantic model 600 of FIG. 6, customer SAD 702, product SAD 1004, and/or CTP SAD 1006 of FIG. 10, UI window 800 of FIG. 8, and/or UI window 900 of FIG. 9. In addition to display screen 1444, system 1400 may include other peripheral output devices (not shown) such as speakers and printers.

System 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable system 1400 to implement features of embodiments described herein. Accordingly, such computer programs represent controllers of the system 1400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1402 to perform any or all of the functions and features of application 102, library 104, user interface 112, computer program 114, data storage interface 116, knowledge base 118, operations 120, semantic objects 132, semantic aware operations 134, and/or non-semantic aware operations 136 as described above in reference to FIG. 1, Jupyter application 202A, Azure ML application 202B, Azure Synapse application 202C, library 204, compute resources 210, metadata interfaces 212, data storage interfaces 214, compute interfaces 216, knowledge base 218, operations 220, semantic aware operations 222, non-semantic aware operations 224, semantic objects 226, dataset interface operations 228, semantic-guided operations 230, suggest operations 232, Pandas compute resource 246, Azure ML compute resource 248, Apache Spark and Koalas compute resource 250, SQL database 252, user interface 254A, and/or computer program 256A as described above in reference to FIG. 2, UI window 800 as described above in reference to FIG. 8, and/or UI window 900 as described above in reference to FIG. 9. The program modules may also include computer program logic that, when executed by processing unit 1402, causes processing unit 1402 to perform any of the steps of any of the flowcharts of FIGS. 10-13, as described above. The program modules may also include computer program logic that, when executed by processing unit 1402, causes processing unit 1402 to perform any of the various associations, developments, enabling, importations, invocations, mappings, merges, obtaining, operations, propagations, references, storage, suggestions, and/or the like associated with embodiments of FIGS. 3-7, as described above.

VIII. Additional Exemplary Embodiments

In an embodiment, a system includes one or more processors and one or more memory devices. The one or more memory devices store program code to be executed by the one or more processors. The program code includes a library and an application. The library includes a data storage interface, one or more semantic objects, and one or more data manipulation or data analysis operations. The application enables a user to import the library into a computer program under development. The importing enables the user to reference code of the library within the computer program under development to generate a dataset from data obtained via the data storage interface and associate the one or more semantic objects with the dataset to generate a semantically-annotated dataset. The importing further enables one or more of: the user to invoke a semantic-guided operation of the library that utilizes the semantically-annotated dataset to infer at least one aspect of a data manipulation or data analysis operation to be performed on the semantically-annotated dataset; or the suggestion of a data manipulation or data analysis operation to the user based on the semantically-annotated dataset.

In an embodiment, the data storage interface is extensible to enable the data to be obtained from any of a plurality of different data stores.

In an embodiment, the library further includes a metadata interface that is configured to access a metadata source from which the one or more semantic object are obtained.

In an embodiment, the library further comprises a compute interface. The compute interface is configured to obtain the data via the data storage interface and to access one or more compute resources to perform the one or more data manipulation or data analysis operations.

In an embodiment, the computer program under development is one of a notebook or a script.

In an embodiment, the performance of one of the data manipulation or data analysis operations on the semantically-annotated dataset includes propagating semantics of the semantically-annotated dataset to an output of the data manipulation or data analysis operation.

In an embodiment, the one or more semantic objects include a semantic function. The associating the one or more semantic objects with the dataset to generate the semantically-annotated dataset includes associating the semantic function with the semantically-annotated dataset.

In an embodiment, the semantic function includes an applicability filter. The suggesting the data manipulation or data analysis operation to the user based on the semantically-annotated dataset includes suggesting the semantic function to the user based on the applicability filter.

In an embodiment, the semantic function includes an applicability filter. The inferring the at least one aspect of the data manipulation or data analysis operation includes inferring a set of attributes to which the semantic function is to be applied based on the applicability filter.

In an embodiment, the suggestion of the data manipulation or data analysis operation to the user based on the semantically-annotated dataset includes a suggestion of one or more arguments of the data manipulation or data analysis operation.

In an embodiment, the library further includes one or more operations that enable the user to create or modify any of the one or more semantic objects.

In an embodiment, the one or more semantic objects include an instantiation of one or more of: an entity class, a logical type class, an attribute class, a relationship class, a constraints class, or a semantic function class.

In an embodiment, a method is performed by an application executing on a computing device. The method includes enabling a user to import a library into a computer program under development. The library includes a data storage interface, one or more semantic objects, and one or more data manipulation or data analysis operations. Based on the importing, the method enables the user to reference code of the library within the computer program under development to generate a dataset from data obtained via the data storage interface and associate the one or more semantic objects with the dataset to generate a semantically-annotated dataset. The method further enables one or more of: the user to invoke a semantic-guided operation of the library that utilizes the semantically-annotated dataset to infer at least one aspect of a data manipulation or data analysis operation to be performed on the semantically-annotated dataset; or the suggestion of a data manipulation or data analysis operation to the user based on the semantically-annotated dataset.

In an embodiment, the data storage interface is extensible to enable the data to be obtained from any of a plurality of different data stores.

In an embodiment, the library further includes a metadata interface that is configured to access a metadata source from which the one or more semantic objects are obtained.

In an embodiment, the library further includes a compute interface configured to obtain the data via the data storage interface and to access one or more compute resources to perform the one or more data manipulation or data analysis operations.

In an embodiment, the computer program under development is one of a notebook or a script.

In an embodiment, the performance of one of the data manipulation or data analysis operations on the semantically-annotated dataset includes propagating semantics of the semantically-annotated dataset to an output of the data manipulation or data analysis operation.

In an embodiment, the one or more semantic objects include a semantic function. The associating the one or more semantic objects with the dataset to generate the semantically-annotated dataset includes associating the semantic function with the semantically-annotated dataset.

In an embodiment, the semantic function includes an applicability filter. The suggesting the data manipulation or data analysis operation to the user based on the semantically-annotated dataset includes suggesting the semantic function to the user based on the applicability filter.

In an embodiment, the semantic function includes an applicability filter. The inferring the at least one aspect of the data manipulation or data analysis operation includes inferring a set of attributes to which the semantic function is to be applied based on the applicability filter.

In an embodiment, the suggestion of the data manipulation or data analysis operation to the user based on the semantically-annotated dataset includes a suggestion of one or more arguments of the data manipulation or data analysis operation.

In an embodiment, the method further includes enabling, based on the importing, the user to reference code of the library to create or modify any of the one or more semantic objects.

In an embodiment, the one or more semantic objects include one or more instantiations of: an entity class, a logical type class, an attribute class, a relationship class, a constraints class, or a semantic function class.

In an embodiment, a method is performed by a computing device. The method includes importing a library into a computer program. The library includes a data storage interface, one or more semantic objects, and one or more data manipulation or data analysis operations. The method further includes generating a dataset from data obtained via the data storage interface. The one or more semantic objects are associated with the dataset to generate a semantically-annotated dataset. The method further includes performing a semantic-guided operation of the library. The semantic-guided operation of the library utilizes the semantically-annotated dataset to infer at least one aspect of a data manipulation or data analysis operation to be performed on the semantically-annotated dataset.

In an embodiment, the library further includes a metadata interface. The method further includes obtaining the one or more semantic objects from a metadata source via the metadata interface.

In an embodiment, the library further includes a compute interface. The obtaining The method includes obtaining the data via the data storage interface via the compute interface. The method further includes accessing one or more compute resources via the compute interface to perform the one or more data manipulation or data analysis operations.

In an embodiment, the computer program is one of a notebook or a script.

In an embodiment, performing the semantic-guided operation of the library includes propagating semantics of the semantically-annotated dataset to an output of the data manipulation or data analysis operation.

In an embodiment, the one or more semantic objects include a semantic function. Associating the one or more semantic objects with the dataset to generate the semantically-annotated dataset includes associating the semantic function with the semantically-annotated dataset.

In an embodiment, the semantic function includes an applicability filter. Inferring the at least one aspect of the data manipulation or data analysis operation includes inferring a set of attributes to which the semantic function is to be applied based on the applicability filter.

In an embodiment, the one or more semantic objects include one or more instantiations of: an entity class, a logical type class, an attribute class, a relationship class, a constraints class, or a semantic function class.

IX. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
one or more processors; and
one or more memory devices that store program code to be executed by the one or more processors, the program code comprising:
a library comprising a data storage interface, one or more semantic objects, and one or more data operations, wherein each data operation comprises a data manipulation operation or a data analysis operation, and wherein each semantic object comprises an instantiation of a class of an object-oriented programming language; and an application that enables a user to import the library into a computer program under development, the importing enabling:

the user to reference code of the library within the computer program under development to generate a dataset from data obtained via the data storage interface, and associate the one or more semantic objects with the dataset to generate a semantically-annotated dataset; and one or more of:

the user to invoke a semantic-guided operation of the library that utilizes the semantically-annotated dataset to infer at least one aspect of a data operation to be performed on the semantically-annotated dataset; or the suggestion of a data operation to the user based on the semantically-annotated dataset.

2. The system of claim 1, wherein the data storage interface is extensible to enable the data to be obtained from any of a plurality of different data stores.

3. The system of claim 1, wherein the library further comprises a metadata interface that is configured to access a metadata source from which the one or more semantic object are obtained.

4. The system of claim 1, wherein the library further comprises a compute interface configured to obtain the data via the data storage interface and to access one or more compute resources to perform the one or more data operations.

5. The system of claim 1, wherein the computer program under development is one of:

a notebook; or a script.

6. The system of claim 1, wherein the performance of one of the data operations on the semantically-annotated dataset comprises propagating semantics of the semantically-annotated dataset to an output of the data operation.

7. The system of claim 1, wherein the one or more semantic objects include a semantic function and wherein associating the one or more semantic objects with the dataset to generate the semantically-annotated dataset comprises associating the semantic function with the semantically-annotated dataset.

8. The system of claim 7, wherein the semantic function includes an applicability filter and wherein suggesting the data operation to the user based on the semantically-annotated dataset comprises suggesting the semantic function to the user based on the applicability filter.

9. The system of claim 7, wherein the semantic function includes an applicability filter and wherein the inferring the at least one aspect of the data operation comprises inferring a set of attributes to which the semantic function is to be applied based on the applicability filter.

10. The system of claim 1, wherein the one or more semantic objects comprise an instantiation of one or more of:

an entity class;

a logical type class;

an attribute class;

a relationship class;

a constraints class; or a semantic function class.

11. A method performed by an application executing on a computing device, comprising:

enabling a user to import a library into a computer program under development, the library comprising a data storage interface, one or more semantic objects, and one or more data operations, wherein each data operation comprises a data manipulation operation or a data analysis operation, and wherein each semantic object comprises an instantiation of a class of an object-oriented programming language;

based on the importing, enabling:

the user to reference code of the library within the computer program under development to generate a dataset from data obtained via the data storage interface and associate the one or more semantic objects with the dataset to generate a semantically-annotated dataset; and one or more of:

the user to invoke a semantic-guided operation of the library that utilizes the semantically-annotated dataset to infer at least one aspect of a data operation to be performed on the semantically-annotated dataset; or the suggestion of a data operation to the user based on the semantically-annotated dataset.

12. The method of claim 11, wherein the performance of one of the data operations on the semantically-annotated dataset comprises propagating semantics of the semantically-annotated dataset to an output of the data operation.

13. The method of claim 11, wherein the one or more semantic objects include a semantic function and wherein associating the one or more semantic objects with the dataset to generate the semantically-annotated dataset comprises associating the semantic function with the semantically-annotated dataset.

14. The method of claim 13, wherein the semantic function includes an applicability filter and wherein suggesting the data operation to the user based on the semantically-annotated dataset comprises suggesting the semantic function to the user based on the applicability filter.

15. The method of claim 13, wherein the semantic function includes an applicability filter and wherein the inferring the at least one aspect of the data operation comprises inferring a set of attributes to which the semantic function is to be applied based on the applicability filter.

16. The method of claim 11, wherein the suggestion of the data operation to the user based on the semantically-annotated dataset comprises a suggestion of one or more arguments of the data operation.

17. The method of claim 11, wherein the method further comprises:

enabling, based on the importing, the user to reference code of the library to create or modify any of the one or more semantic objects.

18. A method performed by a computing device comprising:

importing a library into a computer program, the library comprising a data storage interface, one or more semantic objects, and one or more data operations, wherein each data operation comprises a data manipulation operation or a data analysis operation, and wherein each semantic object comprises an instantiation of a class of an object-oriented programming language;

generating a dataset from data via the data storage interface;

associating the one or more semantic objects with the dataset to generate a semantically-annotated dataset;

performing a semantic-guided operation of the library that utilizes the semantically-annotated dataset to infer at least one aspect of a data operation to be performed on the semantically-annotated dataset.

19. The method of claim 18, wherein said performing the semantic-guided operation of the library comprises propagating semantics of the semantically-annotated dataset to an output of the data operation.

20. The method of claim 18, wherein the one or more semantic objects include a semantic function and wherein said associating the one or more semantic objects with the dataset to generate the semantically-annotated dataset comprises associating the semantic function with the semantically-annotated dataset.

\* \* \* \* \*